Jan. 31, 1956  W. J. BROWN  2,733,395
VARIABLE SPEED ELECTRIC DRIVE AND CONTROL SYSTEM THEREFOR
Filed April 23, 1951  5 Sheets-Sheet 1

*INVENTOR.*
WALTER J. BROWN
BY
Eber J. Hyde
ATTORNEY

Jan. 31, 1956 W. J. BROWN 2,733,395
VARIABLE SPEED ELECTRIC DRIVE AND CONTROL SYSTEM THEREFOR
Filed April 23, 1951 5 Sheets-Sheet 2

*INVENTOR.*
WALTER J. BROWN
BY
*Eber J. Hyde*
ATTORNEY

INVENTOR.
WALTER J. BROWN
BY
Elmer J. Hyde
ATTORNEY

Jan. 31, 1956 W. J. BROWN 2,733,395
VARIABLE SPEED ELECTRIC DRIVE AND CONTROL SYSTEM THEREFOR
Filed April 23, 1951 5 Sheets-Sheet 5

*INVENTOR.*
WALTER J. BROWN
BY
*Elmer J. Hyde*
ATTORNEY

United States Patent Office 2,733,395
Patented Jan. 31, 1956

2,733,395

VARIABLE SPEED ELECTRIC DRIVE AND CONTROL SYSTEM THEREFOR

Walter J. Brown, Titusville, Fla.

Application April 23, 1951, Serial No. 222,378

Claims priority, application Great Britain April 24, 1950

25 Claims. (Cl. 318—249)

This invention relates in general to electric drives including electrical control systems for adjusting and/or controlling the speed of series wound electric motor supplied from a controllable electric converter, and more particularly to such systems in which the converter comprises one or more space discharge devices or rotating electrical machines having an output which is controllable by means of a relatively small signal voltage applied to control terminals of the converter.

One object of the invention is to provide a simple control system which permits the use of a single converter for supplying both the armature and field of the motor.

Another object of the invention is to provide a wide range of control of both the armature and field voltages and thus to enable the motor speed to be adjusted over a wide range.

Another object of the invention is to provide such a system which enables the speed of the motor to be controlled so as to remain substantially constant at a selected value irrespective of fluctuations in the load on the motor.

Another object of the invention is to control the output of the converter by a quantity which is dependent on the ratio between the voltage across the armature winding and the voltage across the field winding, thus tending to maintain constant speed irrespective of load changes.

Another object of the invention is to control the output of the converter by a quantity which is dependent on the ratio between the armature voltage and a non-rectilinear (hereinafter referred to as "non-linear") function of the field voltage, thus tending to maintain constant speed in spite of magnetic saturation in the motor.

Another object of the invention is to provide an improved current limiting arrangement in conjunction with a control circuit which is dependent on a non-linear function of field voltage.

Another object of the invention is to provide a control system for a reversible drive embodying a series-wound motor with two alternative oppositely polarized field windings and a converter having two outputs which are alternatively controlled as hereinbefore described.

Another object of the invention is to provide a simple reversible drive embodying a converter comprising a single rectifier having only one cathode and two sets of controlled anodes.

Another object of the invention is to provide a control for a series motor in which the speed varies in approximately linear relation with the setting of a manual adjusting device, and an alternative object is to provide such a control in which the speed varies in approximately inverse hyperbolic relation with such setting.

Another object of the invention is to provide a simple and effective method for dynamically braking a series wound motor supplied from a controllable electric converter.

Another object of the invention is to provide a simple method of stabilizing an electric drive embodying a control system as hereinbefore described.

For a better understanding of the present invention, together with other and further objects thereof, reference is had to the following description taken in connection with the accompanying drawings, and its scope will be pointed out in the appended claims.

Figure 1:
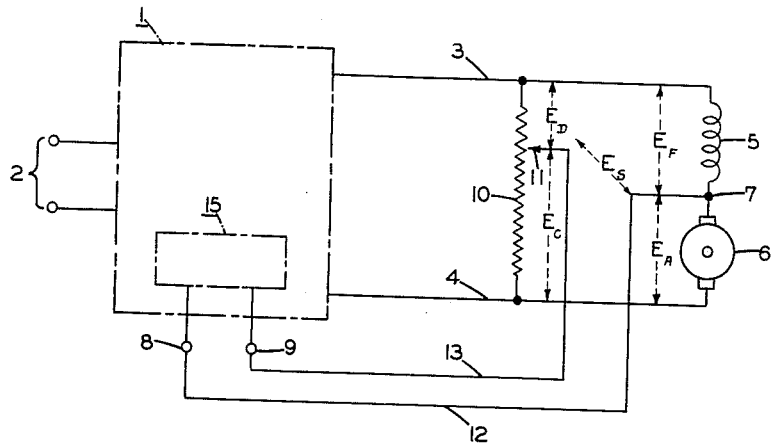
Figure 1 illustrates one form of the invention, in schematic presentation.

Fig. 1 illustrates the invention in schematic form. A controllable electric power converter 1 is arranged to derive its input power from alternating current input terminals 2 and to deliver its output power through conductors 3 and 4 to a series-wound electric motor having a field winding 5 connected in series with an armature 6 through a common point 7. The converter 1 is also provided with control terminals 8 and 9 whereby its output may be controlled by the application of a relatively small voltage across said terminals. A potential divider 10 is also connected across the output conductors 3 and 4, and is provided with a tapping point 11 which is preferably adjustable. The common point 7 and the tapping point 11 are connected by conductors 12 and 13, respectively to the control terminals 8 and 9. The converter 1 is of a type which will deliver an asymmetric output, including a D. C. component as well as any A. C. component which may be present in the form of ripple, the amount of such output being dependent upon a relatively small signal voltage applied between its control terminals 8 and 9. The circuit is so arranged that the converter output will increase continuously as the signal voltage is increased in one direction while it is substantially unresponsive to any signal voltage which might be applied in the opposite direction. For instance, in Fig. 1 it may be assumed that the terminal 3 is the positive output terminal, and terminal 4 is the negative output terminal. The signal voltage is equal to the difference in potential between the tapping point 11 and the common point 7, and the converter 1 is so arranged that its output increases when the potential at 7 becomes more negative with respect to the potential at 11. The converter 1 is arranged to develop a small output voltage, which will be referred to as a "priming" voltage, even when no signal is applied to the control terminals 8 and 9 and, when the tapping point 11 is at the lower, or negative, end of the potential divider 10, this will be the only output of the converter and, accordingly, the motor will not run, or it will idle at a slow speed. When the tapping point 11 is moved up to a point of higher positive potential, a signal voltage will be applied to control terminals 8 and 9 in such a direction as to increase the output of converter 1 and, accordingly, the motor will accelerate. As the speed of the motor increases, the counter-E. M. F. developed by its armature increases, so that the potential of the common point 7 becomes more positive, the signal voltage between control terminals 8 and 9 is reduced, and the output of the converter is reduced until it is just sufficient to keep the motor running at a desired speed. The converter 1 is provided with a sensitive control device, shown schematically by the reference numeral 15, so arranged that a small signal voltage applied to terminals 8 and 9 will produce a large change in output of the converter. Accordingly, the output of the converter is continuously regulated so as to maintain only a small difference of potential between tapping point 11 and common point 7 and in this way the ratio of armature voltage to field voltage of the motor can be maintained substantially equal to the ratio of the resistances of the portions 4—11 and 3—11 of the potential divider. If a mechanical load is applied to the motor armature, its speed will tend to decrease, thus reducing the counter-E. M. F. of the armature, while at the same time the current and therefore the voltage drop in the field 5 are increased, so that the potential of the common point 7 tends to become less positive. This will increase the signal voltage applied to control terminals 8 and 9, thus increasing the output of the converter 1 until a balance is again restored in which, although the output is higher, the ratio of armature voltage to field voltage is restored substantially to its original value, equal to the resistance ratio of the potential divider 10. It will now be shown that this tends to maintain the speed of the motor constant, at a value which may be theoretically independent of its load, while it is dependent on the adjustment of the tapping point 11.

If the motor is assumed to be free from magnetic saturation, its field flux is proportional to its field current and therefore to its field voltage (assuming also constant temperature). The counter-E. M. F. of the armature is proportional to the field flux multiplied by the speed. Accordingly, if the ratio of armature counter-E. M. F. to field voltage is maintained constant, by the method hereinbefore described, the motor speed will remain constant, regardless of changes in load. It might be expected that the loss of armature voltage drop due to its IR drop would make it impossible to maintain a constant speed with a varying load, but I have made a mathematical analysis which leads to the unexpected result that, in spite of the armature IR drop, the speed should theoretically remain constant, regardless of variations in load.

The D. C. components of voltage are indicated in Fig. 1 as follows: $E_A$=armature voltage. $E_F$=field voltage. $E_C$ and $E_D$ are the voltages across the lower and upper portions, respectively, of the potential divider 10. $E_S$=signal voltage between points 11 and 7.

Let $R_A$=resistance of armature and $R_F$=resistance of field.
Let $E_B$=armature counter-E. M. F. and $N$=armature speed.
Let $I$=motor current and $\phi$=field flux.
Let $k_1$ and $k_2$ be constants, dependent on the motor design.

Assuming that the converter has a pure D. C. output and that the motor field is free from magnetic saturation, we have:

Counter-E. M. F.$=E_B=k_1 \cdot N \cdot \phi = k_2 \cdot N \cdot I$
Total armature voltage $E_A = E_B + I \cdot R_A$
$= k_2 \cdot N \cdot I + I \cdot R_A$
Field voltage $E_F = I \cdot R_F$ Assuming that the control device is infinitely sensitive, so that $E_S=0$, we have:

$$\frac{E_A}{E_F}=\frac{E_C}{E_D}=\text{a constant } k_c \text{ dependent only on the potential divider ratio.}$$

Substituting the above values for $E_A$ and $E_F$:

$$\frac{k_2 \cdot N \cdot I + I \cdot R_A}{I \cdot R_F}=k_c$$

$$\frac{k_2 \cdot N + R_A}{R_F}=k_c$$

$$k_2 \cdot N + R_A = K_c \cdot R_F$$

$$N=\frac{k_c \cdot R_F - R_A}{k_2}=\text{constant}$$

It will be seen that, although the speed is dependent upon the resistances of the armature and field, this dependence is constant, with the unexpected result that the speed is theoretically independent of load. For a given motor, the speed is theoretically dependent only on the ratio $k_c$ of the potential divider.

In practice, the speed may vary with load for various reasons, such as the existence of A. C. ripple in the signal voltage $E_s$, and the effect of field saturation causing a non-linear relation between field flux and current, but means will be described for reducing the speed variation due to such effects.

The converter 1 has been described as one having an asymmetric or D. C. output. Arrangements using a converter with an A. C. output are not excluded from the invention, but a converter having a D. C. output appears more practicable and has therefore been described.

The converter 1 may comprise any type of controllable electric power converter for converting alternating current to direct or asymmetric current. For instance, it may comprise one or more space discharge devices, such as vapor or gas-filled rectifier tubes or mercury arc rectifiers, provided with control electrodes or elements by means of which the ignition time and accordingly the output of the converter may be varied, and provided with a sensitive control device such as a phase shifter or a voltage amplifier for effecting such variations in accordance with a small signal voltage. Alternatively, the converter 1 may comprise a rotating machine such as a dynamoelectric amplifier or a motor generator and the sensitive control device may comprise a field winding upon such machine, or an electronic or magnetic amplifier supplying or controlling said field winding.

Figure 2:
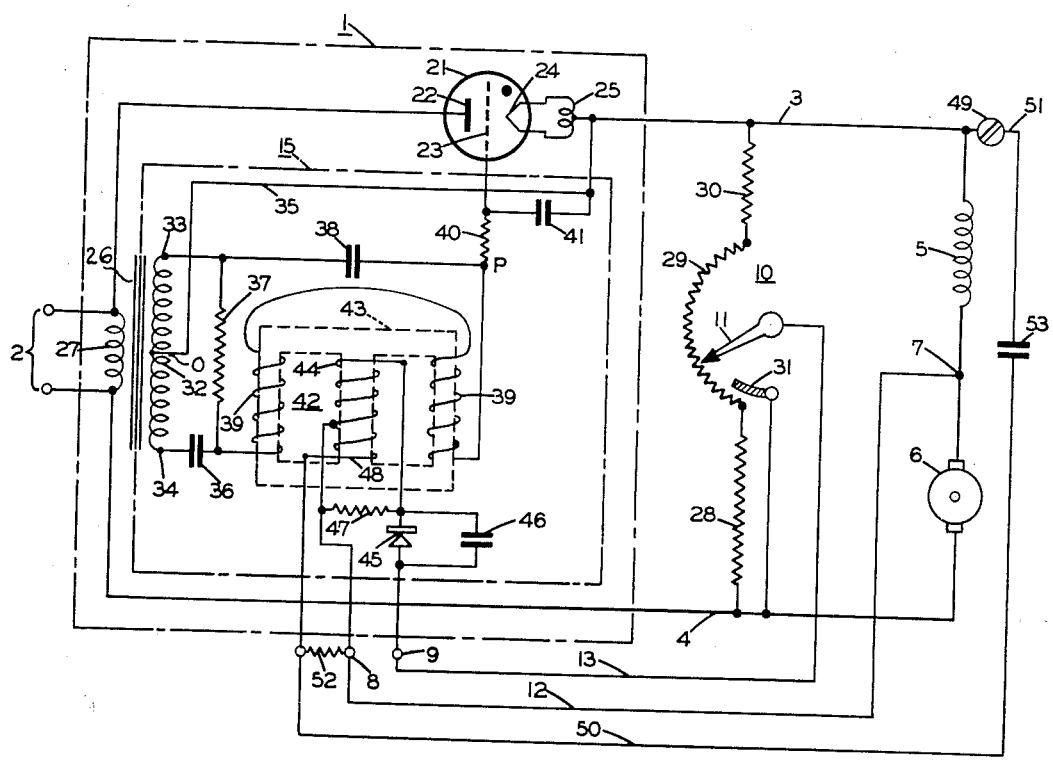
Figure 2 illustrates a practical electric drive based on Figure 1.

Fig. 2 illustrates a simple practical form of the invention which has been successfully used for controlling sewing machine and other fractional horsepower motors. The same reference numerals have been used for the parts corresponding with Fig. 1 and the further details will now be described. The converter 1 comprises the single vapor or gas-filled rectifier tube 21 having an anode 22, a control grid 23 and a cathode 24 which may be heated by the secondary winding 25 of transformer 26, the primary winding 27 of which is connected to the A. C. input terminals 2. The potential divider 10 comprises a fixed resistor 28, a potentiometer 29, and a fixed resistor 30; the values of the resistors 28 and 30 are chosen so as to determine the minimum and maximum resistance ratios of the complete potential divider 10 and accordingly to determine the minimum and maximum speeds of the motor. A contact 31 is adapted to touch the slider or tapping point 11 when the latter is in its extreme low position so as to short-circuit resistor 28 and stop the motor (except for any remaining "priming" voltage) when in that position.

Figure 5:
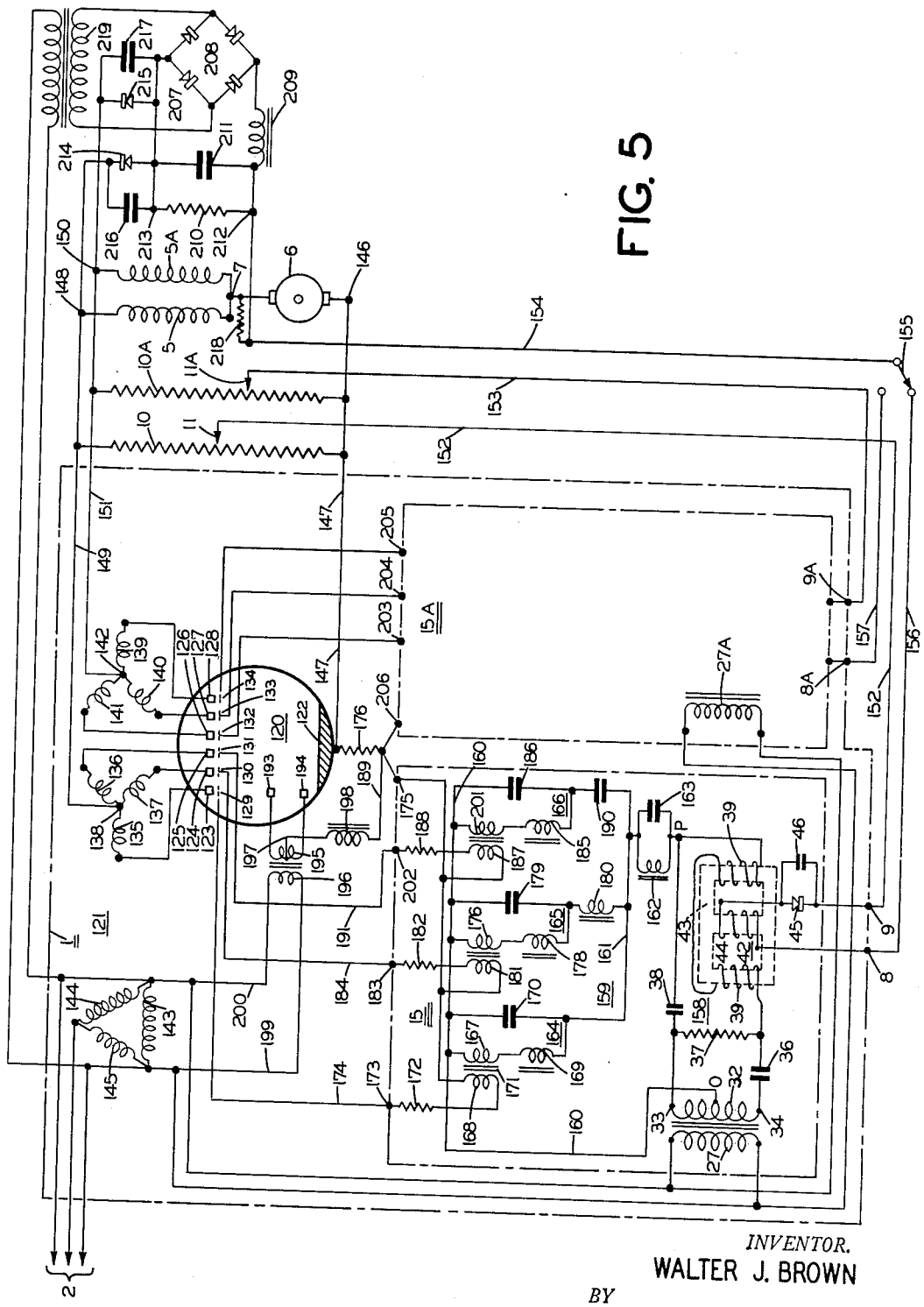
Figure 5 illustrates another practical electric drive based on Figure 1.

The control device 15 comprises a phase shifter similar to that described in Fig. 5 of United States Patent 2,524,762 granted to the applicant, and it operates in accordance with the vector diagram shown in Fig. 2 of said patent. The secondary winding 32 of transformer 26 forms a first branch circuit having end terminals 33, 34, and an intermediate terminal O which forms a first output terminal of the phase shifter and is connected through conductor 35 to the center tap of the cathode transformer winding 25. A second branch circuit includes a capacitor 36 and a resistor 37. A capacitor 38 and a variable inductive element 39 are serially connected across the resistor 37 with a second output terminal P in the series connection between them. Said output terminal P is connected through a filter resistor 40 to the grid 23, and a small capacitor 41 is connected from grid 23 to cathode winding 25 for the purpose of filtering out any high frequency transients. The variable inductive element 39 is formed by the series-connected A. C.

windings of a saturable reactor 42, said windings being located on the two outer legs of a three-legged magnetic core 43 which is shown in dotted lines. A control winding 44 is located on the center leg and is connected to the control terminals 8, 9 and thence through conductors 12, 13 to the common point 7 and the tapping point 11. However, a small dry disc rectifier 45 is interposed in series with conductor 13 and is preferably shunted by a capacitor 46.

The method of operation is similar to that described for Fig. 1. The phase shifter or control device 15 delivers an A. C. voltage to the converter grid 23, the phase angle of which may be varied as shown in the vector diagram, Fig. 2 of United States Patent 2,524,762 with its accompanying description. When no signal voltage is applied to control terminals 8 and 9, the impedance of the A. C. windings 39 is a maximum and the phase angle of the output voltage OP is retarded as far as possible in relation to the cathode-to-anode voltage applied to the tube 21 and accordingly the converter output is a minimum. The exact value of this minimum output is important, since it acts as a priming voltage to ensure energization of the control system when required, and it may be adjusted as follows. A coarse adjustment can be made by altering the value of capacitor 38, an increased value retarding the phase and reducing the output; a fine adjustment can be made by altering the value of resistor 40 or capacitor 41, an increased value of either one slightly retarding the phase and reducing the output.

When an asymmetric or D. C. signal voltage of the appropriate polarity is applied to control terminals 8 and 9, the core 43 tends to saturate, the impedance of the A. C. windings 39 is reduced, and the phase angle of the grid voltage OP is advanced, as will be seen from the vector diagram, thus increasing the output of the converter 1. The purpose of the rectifier 45 is to ensure that the converter output is only increased when the potential of tapping point 11 becomes more positive in relation to common point 7 and that the converter output remains very low if, for instance, the tapping point 11 is suddenly moved downwards to a potential which is more negative than that of point 7; the rectifier 45 prevents loss of control which might otherwise occur under such conditions. The use of a rectifier for this purpose is described in copending United States patent applications Serial Nos. 110,812 and 110,813 as filed by the present applicant. A capacitor 46 is preferably connected across the rectifier 45 in order to reduce the A. C. ripple which is otherwise developed across the rectifier and which is thereby rectified to produce spurious D. C. components of control signal voltage. I have found that such spurious voltages tend to spoil the speed regulation of the motor by allowing the motor to run faster under lightly loaded conditions. Resistor 47 is preferably connected across the control winding 44 for the purpose of stabilizing the performance of the motor. I have found that when the capacitor 46 is large enough to filter out the A. C. ripple effectively, the motor may show a tendency to hunt, or to operate with a speed characteristic which rises as the load is increased; by connecting a resistor 47 of suitable value, as shown, the control device may be de-sensitized just sufficiently to give the desired speed regulation and stability. These questions depend upon the motor and saturable reactor design constants and I have found it possible in some cases to dispense with capacitor 46 and/or resistor 47.

Fig. 2 also illustrates an additional stabilizing or anti-hunting circuit which may optionally be connected through conductor 51 to terminal 49. This circuit comprises an additional control winding 48 on the center leg of the saturable reactor 42, which is connected in series with a capacitor 53 across the motor field winding 5, by means of conductors 12, 50 and 51. I have found it preferable to connect a resistor 52 across the stabilizing winding 48 and to adjust said resistor and the capacitor 53 experimentally to obtain the best results. The use of a stabilizing winding with a saturable reactor has also been described in my copending United States applications, Serial Nos. 110,812, 110,813 and 110,814.

Figure 3:
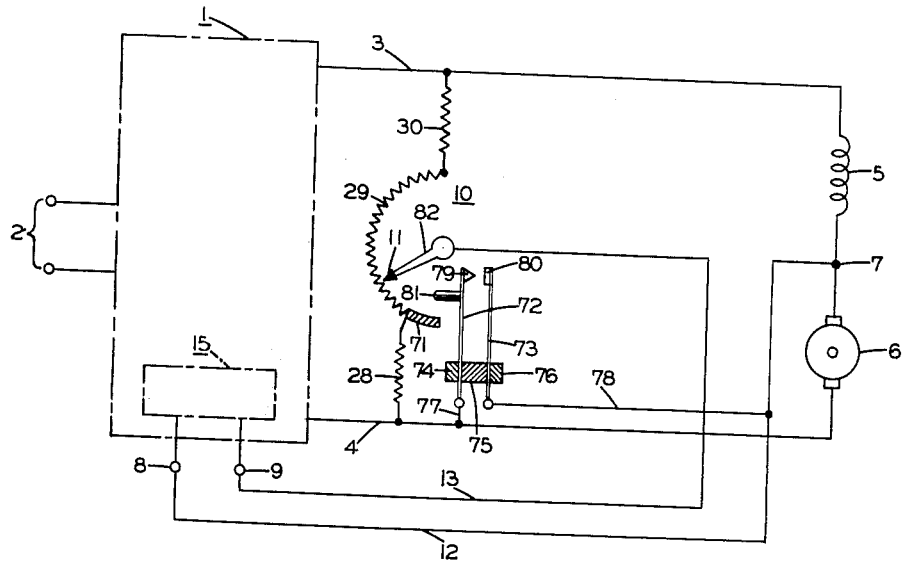
Figure 3 illustrates a modification to Figure 2.

Fig. 3 illustrates an alternative method of arranging the potential divider 10 in Figs. 1 or 2, to provide an "off" position at which the motor will stop, or will idle with only the priming voltage applied to it. Many of the parts of Fig. 3 correspond with parts shown in Figs. 1 and 2 and the same reference numerals are used to identify those parts. However, in Fig. 3, the potentiometer 29 is provided with a dead stud or section 71 which is insulated from the potentiometer winding and is shown as a piece of insulating material. Accordingly, when the tapping point 11 which is mounted on the slider arm 82 is moved to its lowest or extreme counter-clockwise position, the circuit to the conductor 13 is broken so that no signal voltage is applied to the control terminals 8 and 9, and the converter 1 then produces its minimum or "priming" output, at which the motor will run only slowly, if at all.

Fig. 3 also illustrates an additional feature in that it provides for dynamic braking and complete stoppage of the motor in the following way. Two contact springs 72, 73 are mounted by insulating supports 74, 75, 76 and are connected across the armature 6 by means of conductors 77, 78. The springs carry contacts 79 and 80 which are adjusted so as to be normally open, but an insulating stud 81 is mounted on the contact spring 72 and is so positioned that when the slider arm 82 is moved to its extreme counterclockwise position it presses against stud 81 and causes the contact 79 to close against contact 80, thus short-circuiting the armature. The parts are so mounted that this only occurs after the slider 11 has broken its contact with the winding of potentiometer 29, so that the converter 1 is only delivering its minimum or priming output. Under these conditions, the field winding 5 is alone energized by the priming output of converter 1, while the armature is short-circuited and, accordingly, if the armature is still rotating it is subjected to a dynamic braking effect, the amount of which can be predetermined by suitably adjusting the priming output by the methods hereinbefore described.

Figure 4:
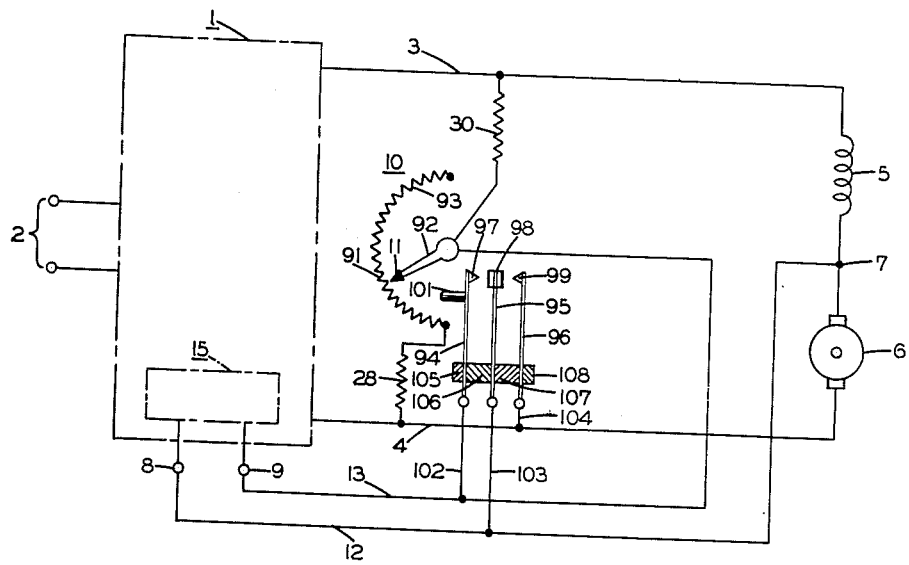
Figure 4 illustrates a further modification to Figure 2.

In the arrangements shown in Figs. 2 and 3, the motor speed is approximately proportional to the ratio between the resistances of the two portions of the potential divider which are respectively below and above the tapping point 11, in other words to the ratio of the resistance between 11 and 4 to the resistance between 11 and 3. Accordingly, the speed will vary in an approximately inverse hyperbolic relationship to the position of the tapping point; as the tapping point or slider is moved upwards, the speed will increase at first very gradually and will then increase more and more rapidly as the slider is moved upwards towards its maximum speed position. This is desirable for some types of drive, such as a sewing machine drive, in which close control is sometimes required at very low speeds, while less critical control is satisfactory at high speeds, but in many other drives a linear relationship of speed to the position of the slider is desirable. Fig. 4 illustrates an arrangement providing substantially linear relationship. Again, the same reference numerals have been used for the parts which are equivalent to those shown in Figs. 1, 2 and 3. In Fig. 4, however, the potential divider 10 comprises a fixed resistor 30 and a variable resistance comprising the rheostat 91 serially connected to the resistor 28. The upper end of resistor 30 is connected to the conductor 3 which is connected to the motor field 5. The lower end of resistor 30 is connected to the slider arm of rheostat 91, and said slider arm carries the tapping point 11 which is movable along the rheostat winding 93. The lower end of rheostat winding 93 is connected in series with resistor 28 to conductor 4 which is connected to the motor armature 6. In this arrangement, the resistance of the portion of the potential divider between tapping point 11 and conductor 3 is fixed, while the resistance of that portion between tapping point 11 and conductor 4 may be increased in linear fashion as the rheostat slider 92 is moved clockwise. Accordingly, the ratio of armature voltage to field voltage, and therefore the speed of the motor, varies in linear relation to the position of slider 92. The maximum speed is determined by the value of resistance 30 in relation to that of the rheostat winding 93 plus the resistance 28. The minimum speed is determined by the value of resistance 28 in relation to that of the resistance 30; resistance 28 may be omitted if there is no objection to a "dead zone" at the lower end of travel of the slider 92, but it has been shown in Fig. 4 for completeness.

Fig. 4 also illustrates means for stopping the motor completely and for dynamic braking if this is desired. Contact springs 94, 95 and 96 carry contacts 97, 98 and 99 which are normally open and the springs are supported from insulating blocks 105, 106, 107, 108. The contact spring 94 carries an insulating stud 101, so positioned that when the slider arm 92 is moved to its extreme counterclockwise position, said arm presses against stud 101 thus closing contacts 97 and 98 and subsequently closing contacts 98 and 99. Contacts 97 and 98 are connected through conductors 102 and 103, respectively, to conductors 13 and 12, and when said contacts are closed any signal voltage between the control terminals 8 and 9 is short-circuited, thus ensuring that the converter 1 can deliver no power other than its predetermined priming output. Contact 99 is connected through conductor 104 to conductor 4 and it will be seen that when contacts 98 and 99 are closed, the motor armature 6 is short-circuited through conductors 104, 4, 12 and 103; accordingly, the priming output of the converter 1 is delivered only to the field 5, while the armature is short-circuited, thus producing a dynamic braking effect if the armature is rotating and also ensuring that the armature will come completely to rest.

Fig. 5 shows an arrangement providing for regenerative braking and/or reversal of the motor, in which the converter has two outputs and the motor has two field windings which are alternatively supplied from said outputs in order to provide forward or reverse rotation of the motor. A current-limiting circuit is also incorporated to limit the current during regenerative braking and reversal, or under overloaded conditions, to a safe value.

The converter 1 is arranged for connection to three-phase A. C. mains 2, and comprises a mercury arc rectifier 120, a main anode transformer 121, various auxiliary circuits to be described, and two control devices 15 and 15A. The mercury arc rectifier 120 has a common cathode 122 and two sets of three anodes, 123, 124, 125 and 126, 127, 128, which are controlled by two sets of grids, 129, 130, 131 and 132, 133, 134 respectively. The anodes 123, 124, 125, are supplied from star-connected secondary windings 135, 136, 137, of transformer 121 which are connected to a star-point 138 which forms the negative terminal for one output of the converter. The anodes 126, 127, 128 are supplied from star-connected windings 139, 140, 141 of transformer 121 which are connected to a star point 142 which forms the negative terminal for the second output of the converter. The cathode 122 forms the positive terminal for both outputs of the converter. The primary windings 143, 144, 145 of transformer 121 are delta-connected for connection to the A. C. mains at 2. The motor armature 6 has its positive terminal connected through conductor 147 to the common cathode 122, while its negative terminal forms the common point 7 to which are connected the positive ends of two field windings 5 and 5A, which are wound with opposite magnetic polarities on the field structure of the motor. The negative terminal 148 of field winding 5 is connected through conductor 149 to the first converter negative output terminal 138, and the negative terminal 150 of field winding 5A is connected through conductor 151 to the second negative output terminal 142 of converter 121. The field winding 5 is of such polarity as to produce forward rotation of the motor, whilst the field winding 5A is of such polarity as to produce reverse rotation, when said windings are respectively energized from the output terminals 138 or 142 of the converter 121.

A potential divider 10 is connected across the first output of the converter 121 between conductors 149 and 147, and is provided with a tapping point 11 which is preferably adjustable. A second potential divider 10A is connected across the second output of the converter, between conductors 151 and 147, and is provided with a tapping point 11A which is also preferably adjustable. The tapping point 11 is connected through conductor 152 to terminal 9 of a control device enclosed within the chain-dotted rectangle 15, and the tapping point 11A is connected through conductor 153 to terminal 9A of a second control device enclosed within the rectangle 15A. The common point 7 is connected through conductor 154 to a switch 155, by means of which it may be connected alternatively through conductor 156 to terminal 8 of control device 15, or through conductor 157 to terminal 8A of control device 15A. A resistor 218 is preferably connected in series with conductor 154 to permit the use of a simple current limiting arrangement as will be described later, but may be omitted if an alternative form of current limiting is used.

The control device 15 comprises a phase shifter 158 and a phase-splitting and peaking network 159 for deriving a three-phase peaky voltage output when supplied with a single phase output from the phase shifter. The phase shifter 158 is similar to that described with reference to Fig. 2 and the same reference numerals have been used so that it is unnecessary to describe it in detail. The only differences are that the rectifier 45 is reversed in polarity, so as to suit the polarity of the entire system, the resistance 47 is omitted, and the stabilizing winding 48 has not been shown, for simplicity. In operation, the phase shifter 158 delivers an output voltage across the terminals OP, the phase angle of which can be advanced by applying an asymmetric signal voltage to the control terminals 8 and 9, when terminal 8 is positive with respect to terminal 9.

The output terminals O and P of the phase shifter 158 are connected to conductors 160 and 161 which form the single-phase input busbars of the phase splitting and speaking network 159. A filter circuit comprising reactor 162 and a condenser 163, which are connected in a parallel and adjusted to resonate at the third harmonic of the supply frequency is preferably connected in series with the input to the network 159 in order to improve the waveform of the input votage.

The network 159 comprises three meshes 164, 165 and 166, each arranged to deliver a peaky output voltage when supplied with a sinusoidal input voltage, together with phase-displacing elements for displacing the phase angle of the output voltages from the three meshes by 120°, relative to each other. The mesh 164 comprises the primary winding 167 of a peaking transformer which also has a secondary or output winding 168, a reactor 169 and a condenser 170. The primary 167 and reactor 169 are connected across the input busbars 160, 161, and are tuned to resonate at the supply frequency by means of the condenser 170 which is also connected across the busbars 160, 161, thus developing a relatively large circulating current around the mesh 164. The core 171 of the peaking transformer is made from high permeability low loss magnetic material, and it is designed to be greatly oversatuated by the circulating current in the mesh 164, so that relatively high voltage peaks of short duration are developed in the secondary winding 168. The lower end of the secondary winding 168 is connected through a limiting resistor 172 to the output terminal 173 which is connected through conductor 174 to the control grid 129 of mercury arc rectifier 120, whilst the upper end of the secondary 168 is connected to the output terminal 175 and there thence through a biasing resistor 176 to the cathode 122.

The mesh 165 is generally similar to the mesh 164, and comprises the primary 176 of a peaking transformer, a reactor 178 and a condenser 179 which are tuned to resonate approximately at the supply frequency. However, the mesh 165 is not connected directly across the busbars 160 and 161, but is connected in series with a phase-displacing reactor 180, across said busbars. The mesh 165 is tuned so that its circulating current is phase-retarded by 60° with reference to the circulating current in the mesh 164, accordingly the peaky voltages developed in the secondary 181 of its peaking transformer are retarded 60° with reference to the peaky voltages developed in the secondary 168. However, the secondary 181 is connected in the opposite polarity to the secondary 168; the upper end of the secondary 181 is connected through resistor 182 to output terminal 183 and thence through conductor 184 to grid 130, whilst the lower end of secondary 181 is connected to output terminal 175. Accordingly, the peaky voltages applied to the grid 130 are phase-advanced by 120° with respect to those applied to those applied to the grid 129.

The mesh 166 is similar to mesh 165, and comprises the primary 201 of the peaking transformer, and the reactor 185 and condenser 186. The mesh 166 is connected in series with condenser 190 across busbars 160 and 161 and is tuned so that its circulating current is phase-advanced by 60° in relation to the circulating current in mesh 164. The secondary 187 of its peaking transformer is connected, at its upper end, through resistor 188 to output terminal 202 and thence through conductor 191 to grid 131. The secondary 187 is connected at its lower end to output terminal 175. Accordingly the polarity of secondary 187 is opposite to that of secondary 168, and the peaky voltage applied to grid 131 therefore lags that applied to grid 129, by 120°. Accordingly each of the grids 129, 130, 131 is supplied with a peaky voltage having a similar phase relationship to its corresponding anode 123, 124, 125, and this phase relationship may be varied by means of the phase shifter 158.

The biasing resistor 176 is supplied with a unidirectional biasing voltage from the auxiliary anodes, 193, 194 of the mercury arc rectifier 120, said anodes being supplied with alternating current from the secondary 195 of an auxiliary transformer having a primary 196 connected through conductors 199, 200 across one phase of the A. C. supply mains. A unidirectional current output is taken from the center tap 197 of secondary 195 and is filtered through reactor 198 and passed through resistor 176 to the cathode 122, so that a unidirectional voltage is developed across resistor 176 which is negative with respect to the cathode 122. Accordingly, the grids 129, 130, 131 are normally biased negatively with respect to cathode 122, but they are "fired," once in every supply frequency cycle, by the positive voltage peaks from the transformer secondaries 168, 181, 187 respectively, whilst the phase angle of the firing voltages is determined by the signal voltage across the control terminals 8 and 9.

The second control device indicated by the chain-dotted rectangle 15A is similar to the control device 15, and its details are accordingly omitted, for simplicity. Control device 15A is supplied from a transformer having a primary winding 27A which is connected in parallel but with opposite polarity to transformer primary 27 by means of conductors 201, 202. Control device 15A also has output terminals 203, 204, 205 which are connected to grids 132, 133, 134, and a common output terminal 206 which is connected to output terminal 175 and to the negative end of the biasing resistor 176. Control device 15A is also provided with control terminals 8A and 9A and it operates to vary the firing angle of grids 132, 133, 134, in accordance with the signal voltage across terminals 8A, 9A.

The system, as so far described, operates in the following way. When the switch 155 is in the position shown in Fig. 5, which will be called the "forward" position, the control terminals 8 and 9 of the "forward" control device 15 are connected in circuit, whilst the control terminals 8A and 9A of the "reverse" control device 15A are disconnected. Accordingly, the "forward" anodes 123, 124, 125 of the rectifier 120 will deliver an output from the output terminal 138, through conductor 149, through "forward" field winding 5, common point 7, armature 6, and conductor 147, to the cathode 122, and this output is dependent upon the signal voltage which is applied to control terminals 8 and 9 through conductors 152, 156 and 154. Conductor 154 is connected (through resistor 218) to the common point 7, and conductor 152 is connected to tapping point 11 on the potential divider 10 which is connected across the rectifier output by means of conductors 149, 147. Accordingly, the output from the "forward" anodes of the converter is determined by the signal voltage between tapping point 11 and common point 7 and, since the control device 15 is a sensitive one, said signal voltage is relatively small and the output is therefore such that the ratio of voltage across the armature 6 to the voltage across the field winding 5 is approximately equal to the ratio of the resistance below the tapping point 11 to the resistance above the tapping point 11 on the potential divider 10. The forward speed of the motor is thus determined by the adjustment of tapping point 11. Meanwhile, since there is no signal voltage applied to the control terminals 8A, 9A of control device 15A, the phase angle of the firing peaks applied to the "reverse" grids 132, 133, 134, is fully retarded and the corresponding "reverse" anodes 126, 127, 128 deliver substantially no output from the "reverse" output terminal 42 except such output as may be required for "priming" purposes in order to energize potential divider 10A.

When the switch 155 is moved to its upper position which will be called the "reverse" position, the control terminals 8A, 9A of control device 15A are connected through conductors 154, 157 and 153 across the common point 7 and the tapping point 11A on potential divider 10A. Accordingly the firing angle of the "reverse" grids 132, 133, 134, is now controlled by the signal voltage between common point 7 and tapping point 11A of the "reverse" potential divider, and an output may be delivered from the corresponding "reverse" anodes 126, 127, 128, through converter output terminal 142, and conductor 151 to the "reverse" field winding 5A and thence through the common point 7, the armature 6 and the conductor 147 to the cathode 122. Since the field winding 5A is reversed in polarity with reference to field winding 5, the motor will now run in a reverse direction, at a speed determined by the adjustment of tapping point 11A on potentiometer 10A. Meanwhile, since the control terminals 8 and 9 of control device 15 are disconnected, the phase angle of the firing peaks applied to the forward grids 123, 124, 125 is fully retarded and the output of the converter from its "forward" output terminal 138 is the minimum output which may be required for "priming" purposes.

The motor may therefore be operated in either direction by moving the switch 155 to connect conductor 154 alternatively with conductor 156 or 157, or the motor may be stopped by moving the switch to an intermediate position when connection is made to neither of conductors 156 or 157. However, it is extremely desirable, if not essential, to provide a current limiting device to maintain a safe maximum current while the motor speed or direction is changed in this way.

A simple form of current-limiting circuit is shown in Fig. 5 in which the voltage drop across the operative field winding is balanced against a reference voltage in a circuit including a rectifier which becomes conducting when the said voltage drop exceeds the reference voltage and the resultant signal voltage acts to reduce the appropriate converter output and thus limit the motor current.

Current-limiting circuits of this general type have been described in United States patent application, Serial No. 48,919, filed September 11, 1948, by the present applicant.

In Fig. 5, reference character 207 indicates a source of reference voltage comprising a bridge rectifier 208 of the dry disc type, supplied with A. C. from a transformer 219 and delivering a unidirectional output through filter reactor 209 to load resistor 210 across which is connected a filter condenser 211. The positive terminal 212 of said reference source is connected to conductor 154, and the negative terminal 213 is connected through dry disc rectifier 214 to terminal 148 and it is also connected through dry disc rectifier 215 to terminal 150. Condensers 216 and 217 are connected across rectifiers 214 and 215 respectively, to reduce the A. C. ripple across them. The principle of operation of this current-limiting circuit is that under normal conditions the mean voltage across each field winding 5 and 5A is less than the reference voltage between terminals 212 and 213 and accordingly neither of the rectifiers 214, 215 will conduct. On the other hand, if the load current through the motor is increased beyond a predetermined value, either by mechanical overload, or by moving switch 155 so as to reverse or accelerate or regeneratively brake the motor, the mean voltage across the field winding 5 or 5A, whichever is then in operation, will rise to a value equal to the reference voltage between 212 and 213 and the corresponding rectifier 214 or 215 which is connected to terminal 148 or 150 of the operative field winding 5 or 5A will then conduct and will prevent any further appreciable rise in voltage between conductor 154 and said terminal 148 or 150. The potential of conductor 154 is thereby restrained from becoming any more positive, and the signal voltage applied to control terminals 8 and 9, or 8 and 9A, whichever pair is operative, is consequently limited and this accordingly limits the output of the rectifier 120 and converter 1. The purpose of the resistor 218 is to absorb any increase in voltage which may occur across the operative field winding 5 or 5A which might occur during the operation of the current-limiting circuit and thus to give predominating control to the current-limiting circuit by restraining any further rise in signal voltage across control terminals 8 and 9, or 8A and 9A.

It will be appreciated that, although the current-limiting circuit has been shown in Fig. 5 in such form as to limit the motor current while the motor is running in either direction, by the use of two current-limiting rectifiers 214 and 215, it may alternatively be applied to limiting the current supplied from a single converter output 138 to a motor having a single field winding 5, merely by omitting one of the current-limiting rectifiers 215 and its associated condenser 217.

In Fig. 5 it has been shown that the motor may be reversed under current-limited conditions, by reversing the switch 155 from contact with conductor 156 to conductor 157, or vice versa, and leaving the switch in its new position until the motor has reversed and come up to speed in the reverse direction, as determined by the positions of tapping points 11A or 11. Alternatively, the motor may be regeneratively braked by reversing the switch 155 until the motor has been braked to a standstill and then opening switch 155 so that neither of the converter outputs from terminals 138 or 142 has any appreciable amount of power. Alternative forms of current-limiting circuit, such as will be described later, may be applied to the reversible drive shown in Fig. 5 or to a non-reversing drive.

In Fig. 5, no stabilizing or anti-hunting circuits have been shown, for simplicity, but in practice it is usually desirable to add stabilizing circuits such as the circuits 51, 53, 50, 48, 52, 12 of Fig. 2, or such as the circuits shown in United States patent applications, Serial Nos. 110,812, 110,813 or 110,814.

In Fig. 5, the usual starting and arc-maintaining electrodes and circuits for the mercury arc rectifier 120 have been omitted, for simplicity.

Figure 6:
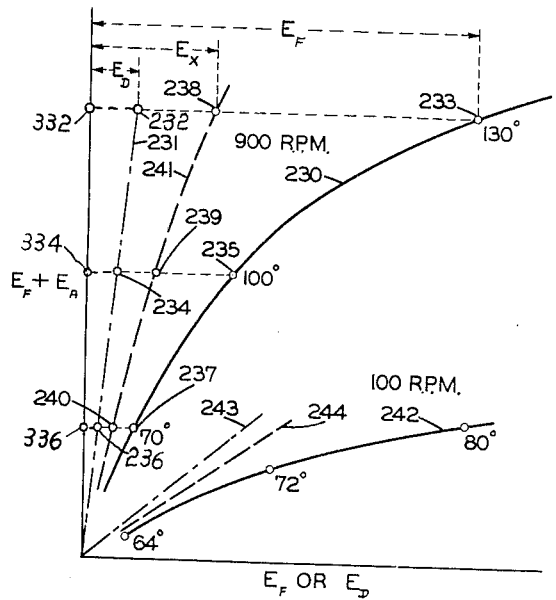
Figure 6 illustrates the preferred control characteristics in comparison with the characteristics of a typical series motor.
Figure 7:
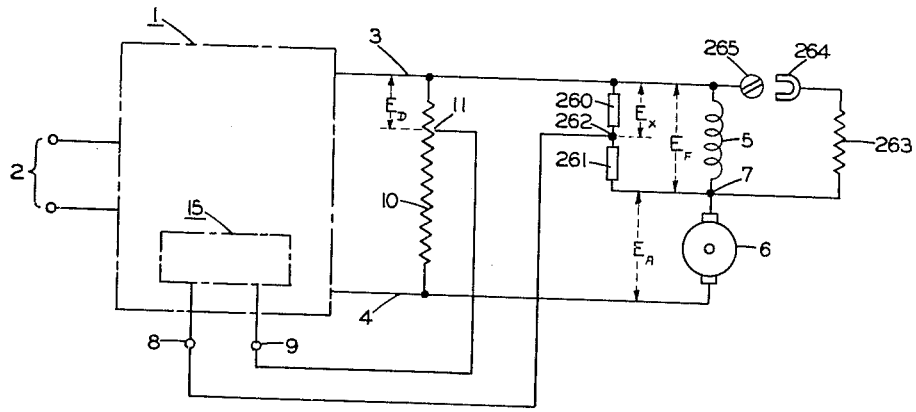
Figure 7 illustrates schematically a modification of the arrangement shown in Figure 1, including means for deriving the preferred control characteristics.

Figs. 6 and 7 illustrate an arrangement in which means are provided to compensate for the non-linear variation in the relation between motor field flux and the voltage across the field winding, due to magnetic saturation.

In Fig. 6, the solid line graph 230 shows the relation between the field voltage $E_F$ and the total motor voltage $E_F+E_A$ in actual tests of a particular 3 horsepower series wound D. C. motor, when operated at a constant speed of 900 R. P. M., under varying conditions of mechanical load. The motor was supplied from a three-phase mercury arc rectifier in a circuit similar to that of Fig. 5, and the figures which are shown with circles adjacent to graph 230 denote the phase angles of the grid firing peaks which are required for three alternative load conditions, these angles being expressed as the angle of advance of the grid firing peak in relation to the instant at which the A. C. input voltage to the corresponding anode falls to zero. A phase advance of 70° is sufficient to run the motor at 900 R. P. M. at no load, while a phase advance of 130° is required to run the motor at the same speed at full load, and a phase advance of 100° is required at an intermediate value of load as shown.

The chain-dotted graph 231 is a straight line showing the relationship between the voltage $E_D$ which is tapped off the potential divider 10 in Fig. 1, and the total motor voltage. The horizontal dotted line joining the points 232 and 233 accordingly has a length equal to the difference in potential between the tapping point 11 and the common point 7 in Fig. 1, and its length therefore represents the signal voltage which is applied to the control terminals 8, 9 of Fig. 1. It will be noted that the graph 230 is non-linear since, owing to magnetic saturation in the motor, it is necessary to increase the field voltage $E_F$ more rapidly as the load is increased, in order to maintain constant speed. The two other horizontal dotted lines 234–235 and 236–237 are drawn to represent by their length the signal voltage which would be applied to control terminals 8 and 9 at the two values of load which require firing advance angles of 100° and 70° respectively. It will also be noted that, on account of the nonlinearity of graph 230, the increments in length of the lines 236–237, 234–235, and 232–233 which represent the control signal voltage increase as the output voltage increases. On the other hand, it will be noted that the corresponding increments of firing angle are 100° minus 70°, equal to 30°, and 130° minus 100°, equal to 30°. In other words, the increments of phase angle are equal.

In order to obtain constant speed under varying load conditions, the control device 15 in Fig. 1 may be arranged to have a sensitivity which decreases as it increases the output of the converter 1, so that increasing increment of signal voltage produce equal increments of phase angle.

An alternative method of compensating for non-linearity due to magnetic saturation is shown in Fig. 7, and its method of operation is illustrated in Fig. 6. Fig. 7 shows the arrangement in schematic form, and as most of the components are similar to those of Fig. 1 the same reference numerals are used for the corresponding components, and the general description of the method of operation will not be repeated. In Fig. 7, however, two resistive elements 260 and 261 are connected in series with each other across the field winding 5, and the point of connection between said resistive elements will be referred to as the intermediate point 262. At least one of the resistive elements 260, 261 has an ohmic value which varies with the voltage applied to it, or in other words it has a "voltage coefficient." The voltage coefficient means the relation between the ohmic value of the resistive element and the voltage applied to it, and includes variation of the ohmic value of the element due to change in temperature caused by variations in the current flowing through the element with variations in voltage across it.

In Fig. 7 a voltage $E_X$ is tapped off the intermediate point 262 for deriving the signal potential applied to control terminal 8, and the voltage coefficients of the elements 260, 261, are such that the ratio of the voltage $E_X$ which is tapped off, to the total voltage $E_F$ across the field winding, varies approximately as the ratio of the motor field flux to the voltage across the motor field winding 5. Accordingly, the voltage $E_X$ which is tapped off is at all times approximately proportional to the motor field flux and therefore if the ratio of this voltage $E_X$ to the armature voltage $E_A$ is maintained constant, the motor speed will remain constant with varying load, regardless of magnetic saturation. Since the field voltage is usually low compared with the armature voltage, it is a sufficiently close approximation to maintain constant the ratio of voltage $E_X$ to the total motor voltage $E_A + E_F$. Fig. 6 illustrates a method for determining the required voltage coefficients of the resistive elements 260 and 261. The control signal voltage required to produce a phase advance of 130° is determined experimentally and is plotted as the distance 232–238 along the horizontal line 231–233. The signal voltage required to produce 100° phase advance is plotted as 234–239 along line 234–235; the signal voltage for a 70° phase advance is plotted as 236–240 along line 236–237. A graph 241 is then drawn through the points 238, 239, 240. If the control device 15 has a linear relation between phase angle and signal voltage, the signal voltages 236–240, 234–239, and 232–238 will have equal increments, corresponding to the equal increments of phase angle 70°, 100° and 130°, and the graph 241 will usually approximate to a straight line passing through the origin. The voltage drops across the resistive elements 260 and 261 can now be measured off, as they are equal to the following distances:

|  | Full load | Intermediate load | No load |
| --- | --- | --- | --- |
| Voltage drop in element 260 | 332–238 | 334–239 | 336–240 |
| Voltage drop in element 261 | 238–233 | 239–235 | 240–237 |

It will be seen that these conditions can be obtained by making resistive element 260 have zero voltage coefficient (constant resistance), while element 261 has a positive voltage coefficient, in which its resistance increases as the voltage increases. It has been found by experiment that a tungsten filament lamp has a suitable voltage coefficient for use as the resistive element 261, together with a fixed resistor 260. Alternatively, the resistive element 260 may have a negative voltage coefficient (resistance decreasing with increased voltage) while element 261 has a zero or a positive voltage coefficient. The essential condition is that the voltage coefficient of element 261 must be sufficiently positive in relation to the voltage coefficient of element 260 to give the appropriate graph 241 in Fig. 6.

It has been found by experiment with a three-phase mercury arc rectifier that if the voltage coefficients are suitably chosen to give the correct graph 241 at a speed of 900 R. P. M., they will also give the correct graphs at other speeds such as 400 R. P. M. and 100 R. P. M. For instance, the graphs 242, 243, 244 are plotted for 100 R. P. M. to correspond with graphs 230, 231 and 241 at 900 R. P. M. When the motor has a highly inductive field winding, the system so far described with reference to Fig. 7 may be unstable due to the fact that a sudden change in motor current will induce a transient voltage across the field winding 5 and will temporarily disturb the ratio of field to armature voltage. In such instances it has been found that the stability may be improved by connecting a resistor 263 in parallel with the field winding 5 and, accordingly, this is shown in Fig. 7 by an optional connection from the lug 264 to the terminal screw 265.

Figure 8:
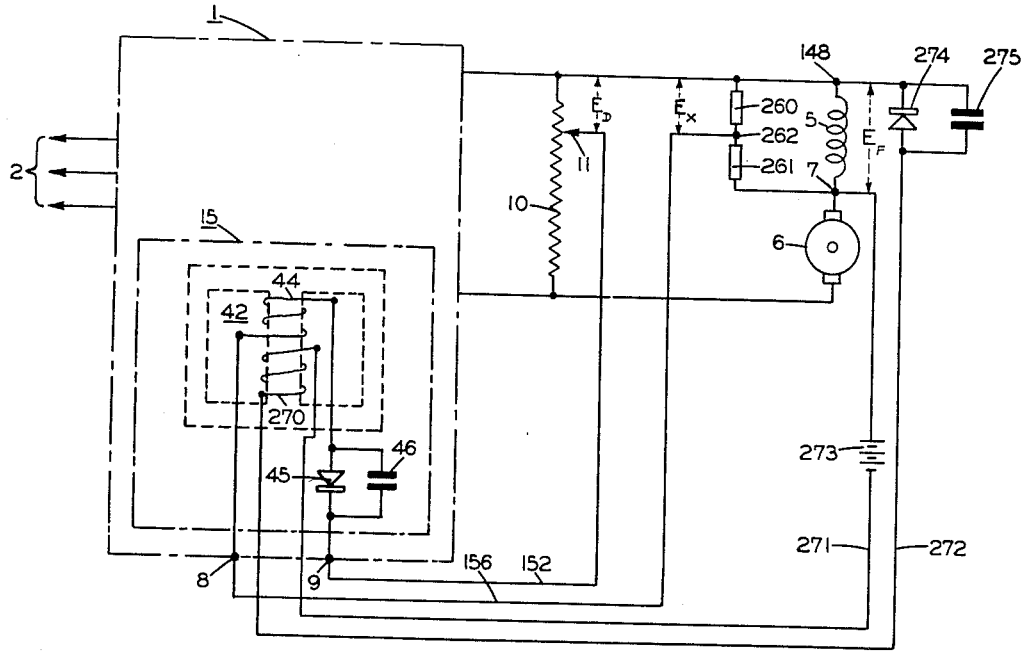
Figure 8 illustrates part of a practical electric drive embodying the schematic arrangement of Figure 7, and also illustrates an improved current limiting arrangement.

Fig. 8 shows a current-limiting arrangement which is an alternative to that shown in Fig. 5, and which makes use of the difference between the voltage coefficients of resistive elements connected in series across the field winding to produce a steeper current limiting effect. Fig. 8 combines certain features of Fig. 5 and Fig. 7 and the same reference numerals are used where possible, but the reversing feature of Fig. 5 is not repeated, for simplicity, although it can be readily incorporated in Fig. 8 as is obvious to those skilled in the art.

In Fig. 8 the control device 15 includes a saturable reactor 42 which has, in addition to other windings, a D. C. control winding 44 which is connected through rectifier 43 (which is bypassed by condenser 46) to control terminals 8 and 9. Control terminal 9 is connected through conductor 152 to tapping point 11 on potential divider 10. Control terminal 8 is connected through conductor 156 to intermediate point 262 which is connected between the two resistive elements 260 and 261 which are connected in series across the field winding 5. The voltage coefficients of the elements 260 and 261 are such that the voltage $E_X$ which is tapped off the element 260 is approximately proportional to the field flux and, accordingly, the arrangement compensates for the magnetic saturation of the field during normal operating conditions.

A current-limiting winding 270 is also provided on the saturable reactor 42 and is connected to conductors 271 and 272. Conductor 271 is connected through a reference source of unidirectional voltage, shown schematically as the battery 273, to the common point 7 of the field and armature. Conductor 272 is connected through a small dry rectifier 274, which may be shunted by a condenser 275, to the end terminal 148 of the field winding. The rectifier 274 is polarized so that it does not conduct as long as the total field voltage $E_F$ across the field 5 is less than the voltage of the reference source 273. However, when the motor load is increased until the total field voltage $E_F$ is slightly greater than the voltage of the reference source 273, the rectifier 274 will conduct and will allow a current to flow through the current limiting winding 270 of the saturable reactor 42. The winding 270 is so polarized as to oppose the magnetization from the control winding 44 and accordingly it acts to reduce the output of converter 1 and to restrain any further rise in the current delivered to the motor. Since the total field voltage $E_F$ applied to the current limit winding 270 rises rapidly when overloaded, as shown by graph 230 in Fig. 6, whilst the voltage $E_X$ applied to the control winding 44 only rises slowly as shown by graph 241 in Fig. 6, the current limiting winding 270 exercises predominating control and steeply limits the rise of current under overloaded conditions. The current limiting circuit 7, 273, 271, 270, 272, 274, 275, 148 which is connected across the field winding 5 in Fig. 9 may alternatively be used in conjunction with the control circuits previously described, such as that shown in Fig. 6, in which the control terminal 8 is connected to the common point 7 instead of to the intermediate point 262. It is unnecessary to illustrate this arrangement, since it is only necessary to assume that element 260 has infinite resistance and that element 261 has zero resistance, in Fig. 6, to illustrate it. Under these conditions, the current-limiting circuit is not so effective as it is when elements 260 and 261 have resistance values chosen with reference to Fig. 6, but it is nevertheless workable.

Figure 9:
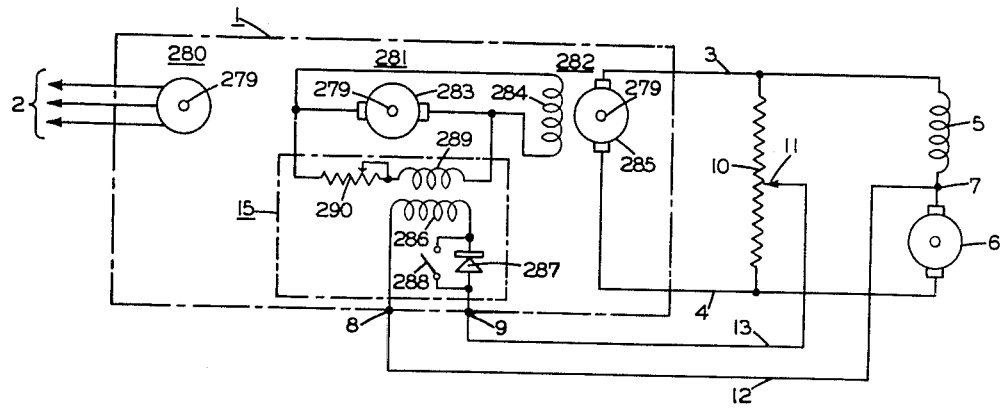
Figure 9 illustrates another practical electric drive based on Fig. 1.

Fig. 9 shows an arrangement in which the controllable electric power converter 1, which is shown in Fig. 1, comprises a rotating machine consisting in this case of a motor-generator having its field circuits arranged so that the motor-generator operates as a sensitive dynamoelectric amplifier. The polyphase A. C. motor 280 is arranged for connection to A. C. mains 2, and the motor 280 is arranged to drive the D. C. exciter 281 and the D. C. generator 282, preferably by mounting the rotors of 280, 281, and 282 on a common shaft 279. The armature 283 of exciter 281 is connected to the field 284 of generator 282, and the armature 285 of generator 282 is connected to conductors 3 and 4 which are the output conductors from the converter. The field 5 and armature 6 of a series wound motor are serially connected, through a common point 7, across the output conductors 3 and 4, and a potential divider 10, having a tapping point 11, is also connected across conductors 3 and 4, in the same way as shown in Fig. 1. The common point 7 and the tapping point 11 are connected through conductors 12 and 13 to converter control terminals 8 and 9 respectively, also as shown in Fig. 1.

In Fig. 9, the control terminals 8 and 9 are connected to a control device 15 which comprises a field winding 286 on the exciter 281. A dry disc rectifier 287 may be connected in series with said field winding 286 but the rectifier 287 may not always be required and a switch 288 is therefore shown, by the closing of which the rectifier 287 may be short-circuited and effectively removed from the circuit.

Under suitable conditions, the circuit of Fig. 9 as so far described may be sufficient to form an operative arrangement of the circuit shown in Fig. 1, since a D. C. signal voltage applied to the control terminals 8 and 9 will vary the output from the exciter armature 283 to the generator field 284, and this will vary to a much greater extent the output of the generator armature 285 to the motor field 5 and armature 6. Providing the connections are correctly polarized, the arrangement will regulate the converter output to such a value as to maintain only a small difference of potential between common point 7 and tapping point 11, corresponding to the D. C. signal voltage applied between terminals 8 and 9, and providing this signal voltage is small enough, the ratio of the voltages across armature 6 and field 5 can be maintained substantially equal to the ratio of voltages across the portions 4—11 and 3—11 of the potential divider 10. However, it is preferable to increase the sensitivity of the control device 15 so that it will operate with the lowest value of signal voltage between terminals 8 and 9 that will give stable operation. The sensivity may be increased in a manner well known to engineers skilled in the art, by connecting an additional self-energizing field winding 289 in series with an adjustable resistor 290 across the exciter armature 283. The resistor 290, which is sometimes referred to as a "tuning resistor," is adjusted so that, when no signal is applied to the control field 286, the self-energizing field current is not quite sufficient to build up the exciter armature voltage. Under these conditions, and providing the resistance of the exciter load 284 is suitably chosen, a very small signal voltage applied to the control field 286 will cause the voltage of the exciter armature 283 to build up to a value which is dependent upon the magnitude of the small signal voltage applied to control terminals 8 and 9.

The theoretical basis for thus increasing the sensitvity of a motor-generator operating as a dynamoelectric amplifier is described in "Electrical Engineering," vol. 69, No. 8, August 1950, pages 713–715.

Although Fig. 9 illustrates the use of one particular form of dynamoelectric amplifier as the controllable converter in my invention, it will be understood that any kind of dynamoelectric amplifier may be used, such as those which are known under the trade names of "Amplidyne," "Rototrol," "Regulex Exciter," and "VSA Regulator," as described in "Electrical Engineering" previously referred to, the only requirement being that the output should be capable of continuous variation over a wide range in accordance with a relatively small control signal voltage. Although stabilizing circuits may be required to obtain the most satisfactory performance from the arrangement of Fig. 9, these have not been shown in the drawing, for simplicity.

What is claimed is:

1. A variable speed electric drive comprising: a controllable electric converter having a first and second control terminal and a first and a second output terminal; an electric motor having a motor circuit including armature and field winding serially connected between said output terminals; a potential divider including a tapping point connected between said output terminals electrically in parallel with said motor circuit; means connecting said tapping point to one of said control terminals; and connection means connecting the other of said control terminals to a given point on said motor circuit where the voltage between said given point and said second output terminal is dependent only on the field voltage.

2. The combination of claim 1, in which the converter has an electrical output from said output terminals, which is controllable from a maximum value down to a predetermined minimum value.

3. A control system for a series wound electric motor having an armature and at least one field winding, comprising; a controllable electric power converter having at least a first and a second control terminal and at least a first and a second output terminal; a motor circuit including said armature and field windings serially connected between said first and second output terminals respectively; a potential divider including a tapping point connected between said output terminals electrically in parallel with said motor circuit; means connecting said tapping point to one of said control terminals; and connection means connecting the other of said control terminals to a given point on said motor circuit where the voltage between said given point and said second output terminal is dependent only on the field voltage.

4. The combination of claim 3, in which the converter has an electrical output from said output terminals, which is controllable from a maximum value down to a predetermined minimum value in accordance with said difference voltage.

5. The combination of claim 3, including mechanical means for moving said tapping point on said potential divider.

6. The combination of claim 1, including mechanical means for moving said tapping point; a switch having contacts in the connections to said control terminals and coacting with said mechanical means to de-energize the electrical connections to said control terminals when said tapping point is moved to a predetermined position.

7. A control system for a series wound electric motor having an armature and at least one field winding with a common point therebetween, comprising: a controllable electric power converter having at least first and second control terminals and having at least two output terminals between which the said armature and field windings are serially connected; a potential divider connected across said serially connected armature and field windings and having a tapping point thereon; a connection from said tapping point to the first control terminal, and a connection from said common point to said second control terminal.

8. The combination of claim 7, in which the converter has an electrical output from said output terminals, which is controllable from a maximum value down to a predetermined minimum value.

9. A control system for a series wound electric motor having an armature and at least one field winding with a common point therebetween, comprising: a controllable electric power converter having at least first and second control terminals and having at least two output terminals between which said armature and field windings are serially connected; a first and a second resistive element having different voltage coefficients and serially connected, through an intermediate point, across said field winding; a potential divider connected across said serially connected armature and field windings and having a tapping point thereon; a connection from said tapping point to said first control terminal; and another connection from said intermediate point to said second control terminal.

10. The combination of claim 9, in which the converter has an electrical output from said output terminals, which is controllable from a maximum value down to a predetermined minimum value.

11. A control system for an electric power converter having first and second control terminals and having output terminals for connection to the armature and field windings respectively of a series motor having a common point therebetween, comprising: first and second resistive elements having different voltage coefficients and serially connected through an intermediate point; means for connecting said serially connected elements across said field winding; a potential divider connected across said output terminals and having a tapping point thereon; a connection from said tapping point to said first control terminal; and another connection from said intermediate point to said second control terminal.

12. A reversible electric drive comprising: a controllable electric power converter having first and second control devices and first, second and third output terminals, an electric motor having an armature and a first field winding serially connected, through a common point, between said first and second output terminals, and a second field winding of opposite polarity connected between said common point and said third output terminal, a first potential divider connected between said first and second output terminals, a second potential divider connected between said first and third output terminals, connections from said first control device to a tapping point on said first potential divider and to said common point, and connections from said second control device to a tapping point on said second potential divider and to said common point.

13. The combination of claim 12, including a switch having contacts in the connections from said first control device and in the connections from said second control device whereby one control device is de-energized while the other control device is energized.

14. In a reversible electric drive including an electric motor having an armature and a first field winding serially connected, through a common point, between first and second motor terminals respectively, and having a second field winding of opposite polarity connected between said common point and a third motor terminal, the provision of a control system comprising: a controllable electric power converter having first, second, and third output terminals for connection to said first, second, and third motor terminals and including first and second control devices; a first potential divider connected between said first and second output terminals and including a first tapping point; a second potential divider connected between said first and third output terminals and including a second tapping point; connections from said first control device to said first tapping point and to said common point, and connections from said second control device to said second tapping point and to said common point.

15. The combination of claim 9, including an improved current limiting device comprising: a source of reference voltage, a current limiting winding associated with said converter, and a rectifier, which are serially connected across the entire field winding so that the current limiting winding exercises predominating control over said converter and limits its output current when said current exceeds a predetermined value.

16. The combination of claim 12, in which the converter has a first electrical output from said first and second output terminals which is controllable from a maximum value down to a predetermined minimum value by said first control device, and the converter has a second electrical output from said first and third output terminals which is controllable from a maximum value down to a predetermined minimum value by said second control device.

17. The combination of claim 12, in which said converter includes a space discharge rectifier having a single cathode connected to said first output terminal; a first set of anodes, and a first set of control elements connected to said first control device; and a second set of anodes, and a second set of control elements connected to said second control device.

18. An electric drive comprising: an electric power converter having an output which is controllable from a maximum value down to a predetermined minimum value, including two control terminals and a first and a second output terminal; an electric motor having an armature and a field winding serially connected between said first and second output terminals respectively, with a common point therebetween; a potential divider connected between said output terminals, and including a tapping point; means connecting said tapping point to one control terminal; means connecting said common point to the other control terminal; and a switch including at least three contacts connected to a control terminal, to the common point, and to the first output terminal whereby the control terminals may be de-energized and the armature thereafter short-circuited to produce a dynamic braking effect.

19. In an electric drive including an electric motor having an armature and a field winding serially connected, through a common point, between armature and field terminals, the provision of a control system comprising: an electric power converter having two output terminals for connection to said armature and field terminals, and two control terminals; a potential divider connected between said output terminals and including a tapping point thereon; a connection from said tapping point to one control terminal; means for connecting the other control terminal to said common point; and a switch including three contacts connected to a control terminal, to said common point, and to said armature terminal whereby the control terminals may be de-energized and the armature short-circuited.

20. A control system for a series-wound electric motor having an armature and a field winding serially connected, through a common point, between armature and field terminals, comprising: an electric power converter having two output terminals for connection to said armature and field terminals, and including a control device; a potential divider connected across said output terminals and including a tapping point; a connection from said tapping point to said control device; means for connecting said common point to said control device; and means for connecting said field terminal to said control device, said means including a serially connected capacitor, for the purpose of stabilizing the system.

21. The combination of claim 3 wherein the potential divider comprises a potentiometer including a slider which carries the tapping point.

22. The combination of claim 3 wherein the potential divider comprises a rheostat and a resistor serially connected through a connection point which constitutes the tapping point.

23. The combination of claim 1, including a resistor and means for connecting said resistor in parallel with said field winding for the purpose of reducing transient voltages across said winding.

24. A controllable electric power converter in combination with a potential divider, said power converter having two control terminals and an output circuit adapted for connection to the first and second power terminals of a series wound motor circuit, said motor circuit having a third terminal intermediate in potential between said power terminals such that the voltage between said first and third terminals is representative of the motor field flux and the voltage between said third and second terminals is representative of the motor armature voltage, and said potential divider having end terminals connected across at least a portion of said series wound motor circuit and a tapping connected to one control terminal, the other control terminal being adapted for connection to said third terminal on said motor circuit.

25. A control system for a series wound electric motor having an armature and at least one field winding, comprising: a controllable electric power converter having at least two control terminals and at least two output terminals; a series motor circuit including said armature and field windings connected in series between said two output terminals; means for deriving a first and a second feedback voltage which are representative of field flux and armature voltage respectively, comprising an electric connection from a point on said series circuit to one of said control terminals; a potential divider connected substantially in parallel with said series motor circuit and including a tapping point which divides the voltage across said potential divider into first and second components; and an electrical connection from said tapping point to the other of said control terminals, whereby said first and second feedback voltages are balanced against said first and second components to establish a difference voltage which is applied between said control terminals.

References Cited in the file of this patent

UNITED STATES PATENTS

| | | |
|---|---|---|
| 2,289,171 | Baston | July 7, 1942 |
| 2,537,676 | Knauth et al. | Jan. 9, 1951 |
| 2,540,452 | Knauth | Feb. 6, 1951 |
| 2,552,206 | Moyer | May 8, 1951 |
| 2,558,086 | Herchenroeder | June 26, 1951 |